US012738664B2

(12) United States Patent
Rowell et al.

(10) Patent No.: US 12,738,664 B2
(45) Date of Patent: Sep. 15, 2026

(54) ANTENNA AND ANTENNA ARRAY

(71) Applicant: Rohde & Schwarz GmbH & Co. KG, Munich (DE)

(72) Inventors: Corbett Rowell, Prien am Chiemsee (DE); Andreas Raith, Prackenbach (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 268 days.

(21) Appl. No.: 18/409,460

(22) Filed: Jan. 10, 2024

(65) Prior Publication Data

US 2024/0283162 A1 Aug. 22, 2024

(30) Foreign Application Priority Data

Feb. 20, 2023 (EP) .................................... 23157528

(51) Int. Cl.
*H01Q 15/16* (2006.01)
*G01S 3/04* (2006.01)
*H01Q 21/20* (2006.01)

(52) U.S. Cl.
CPC ............ *H01Q 15/16* (2013.01); *G01S 3/043* (2013.01); *H01Q 21/20* (2013.01)

(58) Field of Classification Search
CPC ......... H01Q 15/16; H01Q 21/20; G01S 3/043
See application file for complete search history.

(56) References Cited

U.S. PATENT DOCUMENTS 3,255,343 A 6/1966 Kloss
5,270,726 A 12/1993 Axtell et al.
10,050,752 B1 * 8/2018 Bales ..................... H01Q 3/242
10,892,544 B2 * 1/2021 Pance .................... H01Q 19/06
2003/0184490 A1 * 10/2003 Raiman .................. H01Q 1/246
343/890
2012/0013516 A1 * 1/2012 Ahn ..................... H01Q 25/007
343/837
2012/0081675 A1 4/2012 Kano
2016/0359237 A1 * 12/2016 Quan ..................... H01Q 21/24
2019/0207686 A1 * 7/2019 Rowell .................. H01Q 15/14

FOREIGN PATENT DOCUMENTS

DE 3415867 A1 10/1985
DE 102006059903 A1 6/2008
DE 102008047728 A1 3/2010
DE 102008047278 A1 4/2010
DE 102012102435 A1 9/2013
DE 102012102441 A1 9/2013
DE 202018104881 U1 10/2018
DE 102008047728 B4 1/2021
(Continued)

OTHER PUBLICATIONS

Office Action for related European Patent Application No. 23157528. 3-1205, dated Jul. 26, 2023, 6 pages.

*Primary Examiner* — Nazra Nur Waheed
(74) *Attorney, Agent, or Firm* — DITTHAVONG, STEINER & MLOTKOWSKI

(57) ABSTRACT

An antenna array is provided. Said antenna array comprises at least two antennas with at least two reflectors. In this context, at least two adjacent reflectors of the at least two reflectors are connected with a double-tangential blended elliptical surface.

15 Claims, 7 Drawing Sheets

(56) References Cited

FOREIGN PATENT DOCUMENTS

| | | | |
|---|---|---|---|
| EP | 1936262 | A1 | 6/2008 |
| TW | M394489 | U | 12/2010 |
| WO | 10031743 | A1 | 3/2010 |
| WO | 13139896 | A1 | 9/2013 |
| WO | 2022180378 | A1 | 9/2022 |

* cited by examiner

ANTENNA AND ANTENNA ARRAY

This application claims priority to European Patent Application No. 23 157 528.3, entitled “Antenna and Antenna Array,” filed Feb. 20, 2023, which is incorporated herein by reference in its entirety.

The invention relates to an antenna and an antenna array. In particular, the invention relates to an antenna and an antenna array for direction finding, especially wideband direction finding.

Generally, in times of an increasing number of applications providing direction finding capabilities, there is a growing need of an antenna and an antenna array for being employed in the context of such applications in order to allow for direction finding in a particular accurate and efficient manner, thereby ensuring low space requirements and low costs.

Document U.S. Pat. No. 5,270,726 A relates to a compact range system including a feed antenna offset from the rectangular-aperture paraboioidal reflector. The reflector has blended edges and smoothed corners to reduce contamination of propagated electromagnetic plane waves by diffracted energy. In accordance with said document, the continuous, smooth surface of the reflector should maximize the purity and uniformity of the plane waves from the reflector. Nevertheless, said document does not even recognize the problem that for wideband antennas with a cavity or reflector, respectively, behind the corresponding driving element, the edges of the reflector act as radiating sources. Disadvantageously, this results in strong sidelobes at +−90 degrees from the boresight or main direction, respectively, thereby not allowing for an accurate and efficient direction finding.

Accordingly, there is the object to provide an antenna and an antenna array especially allowing for direction finding in a particular accurate and efficient manner, thereby ensuring low space requirements and low costs.

This object is solved by the features of the first independent claim for an antenna and the features of the second independent claim for an antenna array. The dependent claims contain further developments.

According to a first aspect of the invention, an antenna is provided. Said antenna comprises at least two radiating elements with at least two reflectors offset from the at least two radiating elements. In this context, at least two adjacent reflectors of the at least two reflectors are connected with a double-tangential blended elliptical surface. Advantageously, this allows for direction finding in a particular accurate and efficient manner, thereby ensuring low space requirements and low costs. Further advantageously, the antenna can be a Compact Antenna Test Range (CATR) antenna especially such that the CATR antenna or a dual CATR system, respectively, can be milled from a single metal block.

According to a first preferred implementation form of the first aspect of the invention, the double-tangential blended elliptical surface comprises or is a double-tangential blended elliptical reflector. Additionally or alternatively, the antenna is used for direction finding, especially wideband direction finding. Advantageously, for instance, re-radiating edges can be avoided, thereby increasing accuracy.

According to a second preferred implementation form of the first aspect of the invention, the double-tangential blended elliptical surface is configured to create a smooth surface. Advantageously, for example, the transition between the corresponding reflector and the elliptical curve appears completely smooth for all frequencies of interest.

According to a further preferred implementation form of the first aspect of the invention, the smooth surface is configured such that there is no boundary between the at least two adjacent reflectors especially in order to avoid creating a Huygen’s source or any kind thereof. Advantageously, for instance, re-radiated energy can efficiently be prevented.

According to a further preferred implementation form of the first aspect of the invention, the at least two radiating elements are four radiating elements, preferably four wideband radiating elements. In addition to this or as an alternative, the at least two reflectors are four reflectors. Further additionally or further alternatively, the antenna comprises four double-tangential blended elliptical surfaces. Advantageously, for example, especially in the context of a directional antenna with four cardinal directions, sidelobes at −90 degrees or 90 degrees, respectively, from the main direction can efficiently be suppressed.

According to a further preferred implementation form of the first aspect of the invention, the at least two reflectors are arranged in a circular manner. Advantageously, for instance, complexity can be reduced, which leads to an increased efficiency.

According to a further preferred implementation form of the first aspect of the invention, at least one, preferably each, of the at least two reflectors comprises or is of a parabolic shape. Advantageously, for example, the antenna can efficiently be adapted to the space requirements of the corresponding application in a flexible manner, which analogously applies for the following further preferred implementation forms of the first aspect of the invention.

According to a further preferred implementation form of the first aspect of the invention, at least one, preferably each, of the at least two reflectors comprises or is of a circular shape.

According to a further preferred implementation form of the first aspect of the invention, at least one, preferably each, of the at least two reflectors comprises or is of a flat, especially square, shape.

According to a further preferred implementation form of the first aspect of the invention, at least one, preferably each, of the at least two reflectors comprises or is of a ellipsoidal shape.

According to a further preferred implementation form of the first aspect of the invention, at least one, preferably each, of the at least two reflectors comprises or is of a hyperbolic shape.

According to a second aspect of the invention, an antenna array is provided. Said antenna array comprises at least two antennas with at least two reflectors. In this context, at least two adjacent reflectors of the at least two reflectors are connected with a double-tangential blended elliptical surface. Advantageously, this allows for direction finding in a particular accurate and efficient manner, thereby ensuring low space requirements and low costs. Further advantageously, the antenna array can be a Compact Antenna Test Range (CATR) antenna array especially such that the CATR antenna array or a dual CATR system, respectively, can be milled from a single metal block.

According to a first preferred implementation form of the second aspect of the invention, at least one of the at least two antennas comprises or is an antenna according to the first aspect of the invention or any of its preferred implementation forms, respectively. Additionally or alternatively, the antenna array is used for direction finding, especially wideband direction finding. Advantageously, for instance, re-radiating edges can be avoided, thereby increasing accuracy.

According to a second preferred implementation form of the second aspect of the invention, each of the at least two antennas comprises or is an antenna according to the first aspect of the invention or any of its preferred implementation forms, respectively. Advantageously, for example, both accuracy and efficiency can further be increased.

According to a further preferred implementation form of the second aspect of the invention, the at least two antennas are four antennas, preferably four circularly arranged antennas. Advantageously, for instance, complexity can be reduced, which leads to an increased efficiency.

According to a further preferred implementation form of the second aspect of the invention, the double-tangential blended elliptical surface comprises or is a double-tangential blended elliptical reflector. Advantageously, for example, re-radiating edges can be avoided, thereby increasing accuracy.

According to a further preferred implementation form of the second aspect of the invention, the double-tangential blended elliptical surface is configured to create a smooth surface. Advantageously, for instance, the transition between the corresponding reflector and the elliptical curve appears completely smooth for all frequencies of interest.

According to a further preferred implementation form of the second aspect of the invention, the smooth surface is configured such that there is no boundary between the at least two adjacent reflectors especially in order to avoid creating a Huygen's source or any kind thereof. Advantageously, for instance, re-radiated energy can efficiently be prevented.

According to a further preferred implementation form of the second aspect of the invention, the at least two reflectors are four reflectors. Additionally or alternatively, the antenna array comprises four double-tangential blended elliptical surfaces. Advantageously, for example, especially in the context of a directional antenna array with four cardinal directions, sidelobes at −90 degrees or 90 degrees, respectively, from the main direction can efficiently be suppressed.

According to a further preferred implementation form of the second aspect of the invention, at least one, preferably each, of the at least two reflectors comprises or is of a parabolic shape. Advantageously, for instance, the antenna array can efficiently be adapted to the space requirements of the corresponding application in a flexible manner, which analogously applies for the following further preferred implementation forms of the second aspect of the invention.

According to a further preferred implementation form of the second aspect of the invention, at least one, preferably each, of the at least two reflectors comprises or is of a circular shape.

According to a further preferred implementation form of the second aspect of the invention, at least one, preferably each, of the at least two reflectors comprises or is of a flat, especially square, shape.

According to a further preferred implementation form of the second aspect of the invention, at least one, preferably each, of the at least two reflectors comprises or is of a ellipsoidal shape.

According to a further preferred implementation form of the second aspect of the invention, at least one, preferably each, of the at least two reflectors comprises or is of a hyperbolic shape.

Exemplary embodiments of the invention are now further explained with respect to the drawings by way of example only, and not for limitation. In the drawings.

Figure 1A:
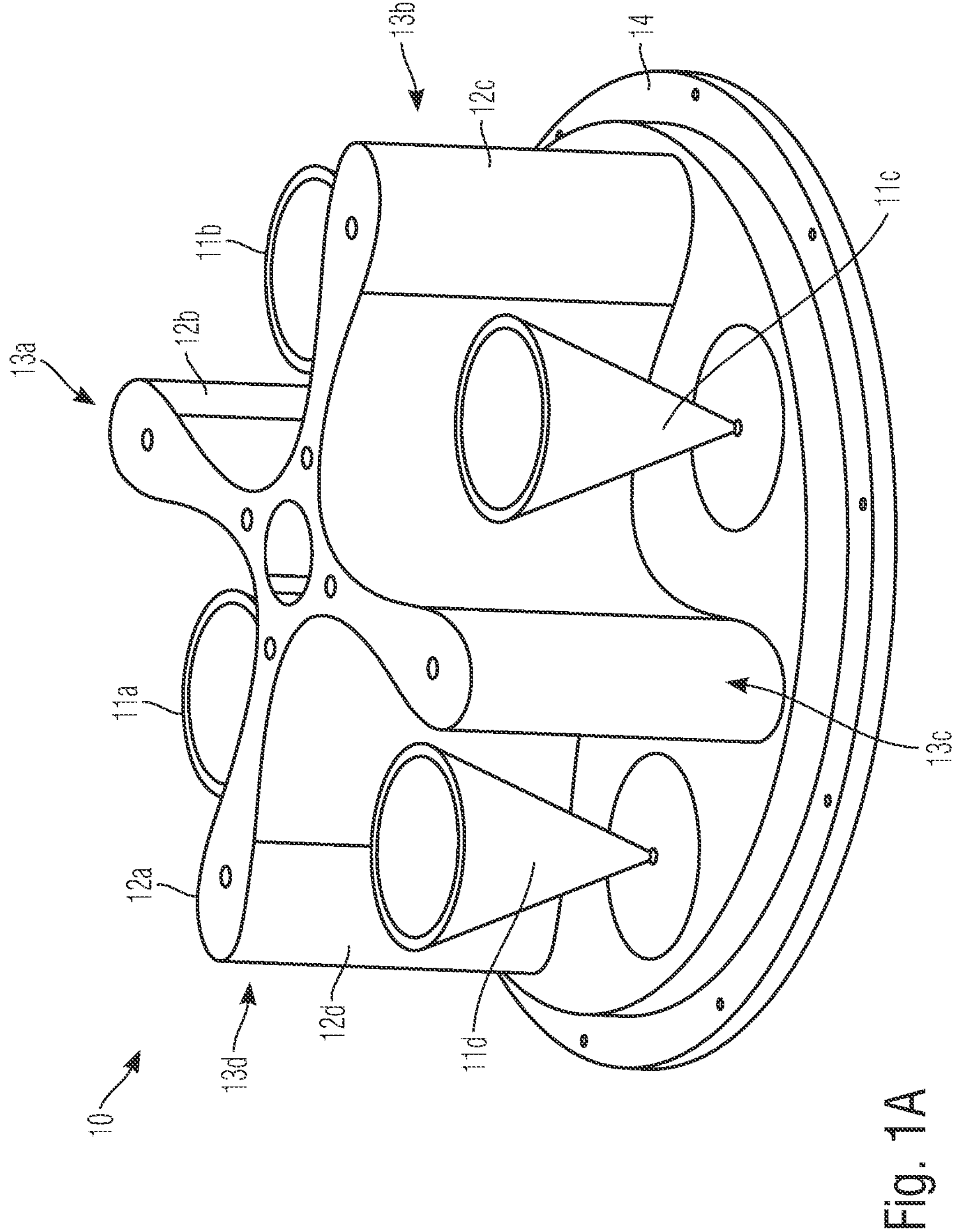
FIG. 1A shows an exemplary embodiment of an antenna array or an antenna, respectively, in the sense of the invention in a three-dimensional view.
Figure 1B:
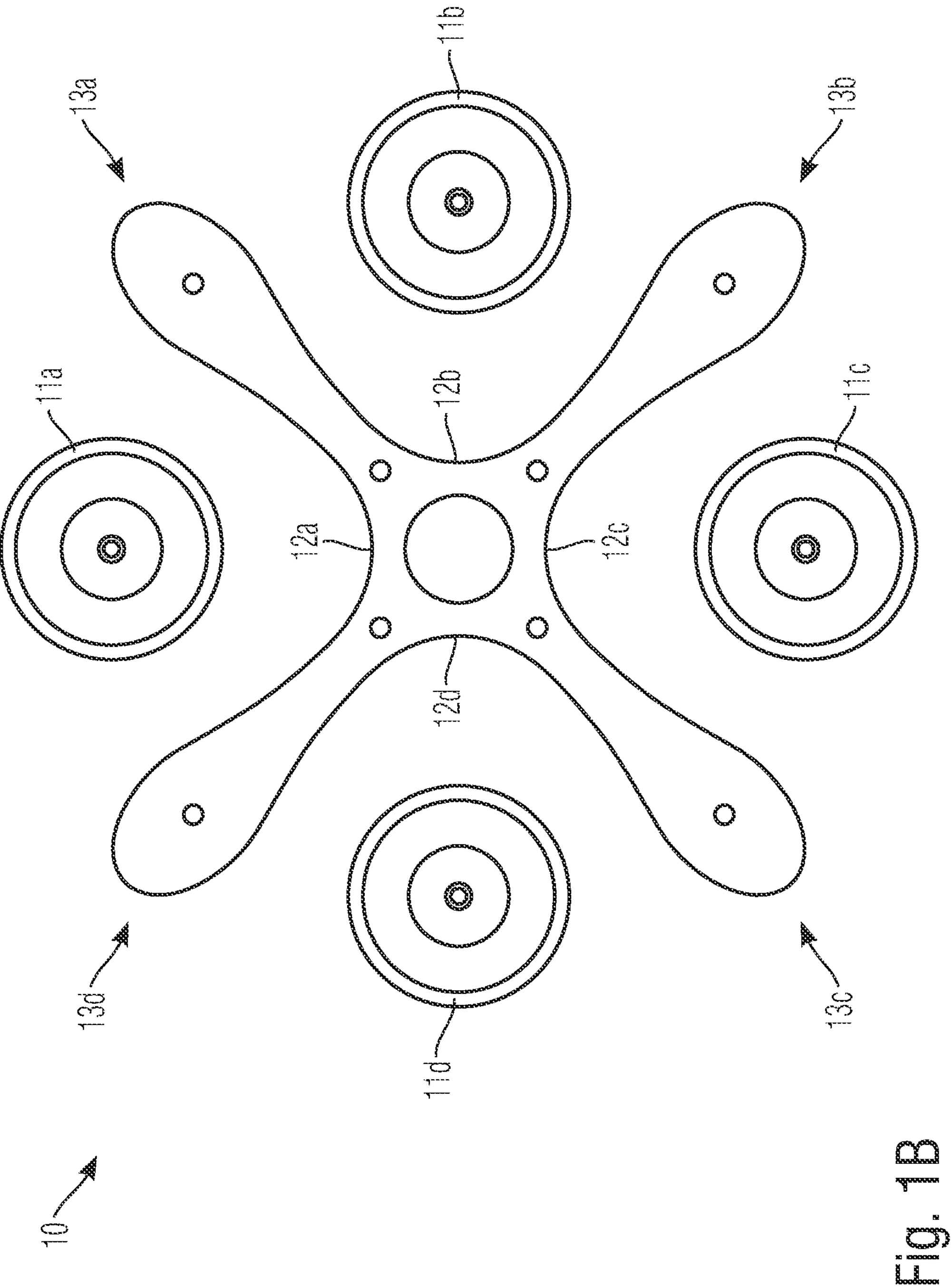
FIG. 1B shows a top view of the antenna array or antenna, respectively, of FIG. 1A.

With respect to FIG. 1A and FIG. 1B, an exemplary embodiment of antenna array 10 in the sense of the invention is illustrated in a three-dimensional view and a top view.

According to FIG. 1, said antenna array 10 exemplarily comprises four antennas with four reflectors 12*a*, 12*b*, 12*c*, 12*d*. In this context, every adjacent reflectors of the four reflectors 12*a*, 12*b*, 12*c*, 12*d* are connected with a double-tangential blended elliptical surface. The corresponding double-tangential blended elliptical surfaces are equipped with reference signs 13*a*, 13*b*, 13*c*, 13*d*.

It is noted that it might be particularly advantageous if the antenna array 10 is used for direction finding.

As it can further be seen from FIG. 1A or FIG. 1B, respectively, the four antennas are exemplarily arranged in a circular manner.

In this exemplary case, each of the antennas comprises a monocone feed 11*a*, 11*b*, 11*c*, 11*d* especially for inputting an input signal and/or outputting an output signal, and the corresponding one of the above-mentioned four reflectors 12*a*, 12*b*, 12*c*, 12*d* or a corresponding reflecting surface, respectively, especially comprising a parabolic shape preferably for transmitting the input signal as an electromagnetic output wave and/or receiving an electromagnetic input wave as the output signal.

It might be particularly advantageous if the monocone feeds 11*a* 11*b*, 11*c*, 11*d* substantially form the corners of an imaginary square. In other words, an angle between two neighboring ones of said monocone feeds 11*a*, 11*b*, 11*c*, 11*d* is especially between 80 degrees and 100 degrees, preferably between 85 degrees and 95 degrees, more preferably between 88 degrees and 92 degrees, most preferably between 89.5 degrees and 90.5 degrees.

With respect to the above-mentioned parabolic shape, it is noted that said parabolic shape may preferably be a two-dimensional parabolic shape.

It is further noted that it might be particularly advantageous if the reflectors 12*a*, 12*b*, 12*c*, 12*d* or reflecting surfaces, respectively, are sandwiched between two planar surfaces. In this context, one of such planar surfaces is exemplarily illustrated in FIG. 1A and equipped with reference sign 14, wherein the corresponding other planar surface has been omitted to allow a detailed look inside the antenna array 10. Preferably, said corresponding other planar surface would be substantially parallel to the planar surface 14.

It might be particularly advantageous if the respective reflectors 12*a*, 12*b*, 12*c*, 12*d* or the respective reflecting surfaces, respectively, and said two planar surfaces form a corresponding cavity. Exemplarily, four corresponding cavities are formed. Preferably, each of the above-mentioned monocone feeds 11*a*, 11*b*, 11*c*, 11*d* is located inside the corresponding cavity or the corresponding one of the four cavities, respectively.

Furthermore, it might be particularly advantageous if at least one, preferably each, of the monocone feeds 11*a*, 11*b*, 11*c*, 11*d* is placed at a focal line of the corresponding one of the reflectors 12*a*, 12*b*, 12*c*, 12*d*, or reflecting surfaces, respectively. In this context, it is noted that the above-mentioned planar surfaces, wherein one of said planar surfaces is explicitly shown and equipped with reference sign 14, may especially be substantially perpendicular to said focal line.

It is further noted that the term "substantially perpendicular" is especially to be understood as an angle between 80 degrees and 100 degrees, preferably between 85 degrees and 95 degrees, more preferably between 88 degrees and 92 degrees, most preferably between 89.5 degrees and 90.5 degrees.

Moreover, especially as an alternative, at least one, preferably each, of the monocone feeds 11*a*, 11*b*, 11*c*, 11*d* can be offset from a focal line, such as the above-mentioned focal line, and/or a focal point of the corresponding reflector or reflecting surface, respectively, such as the reflectors 12*a*, 12*b*, 12*c*, 12*d*.

In this context, the term "offset" is especially to be understood as deviating from said focal line and/or said focal point of the corresponding reflector or reflecting surface, respectively, not more than 20 percent, preferably 10 percent, more preferably 5 percent, most preferably 1 percent, of the corresponding smallest or largest diameter of the monocone feed 11*a*.

With respect to the above-mentioned two planar surfaces, it is noted that it might be particularly advantageous if said two planar surfaces are of circular shape and/or of the same size.

Moreover, especially for the sake of completeness, it is noted that both all the explanations above and all the explanations below may analogously apply for an inventive antenna and vice versa. In this context, an antenna of the antenna array may especially be seen as a radiating element of the antenna. Accordingly, FIG. 1A or FIG. 1B, respectively, does also illustrate an exemplary embodiment of the inventive antenna.

With respect to the above-mentioned double-tangential blended elliptical surface, it is noted that it might be particularly advantageous if the double-tangential blended elliptical surface comprises or is a double-tangential blended elliptical reflector.

Furthermore, said double-tangential blended elliptical surface may especially be configured to create a smooth surface.

It might be particularly advantageous if said smooth surface is configured such that there is no boundary between the at least two adjacent reflectors especially in order to avoid creating a Huygen's source or any kind thereof.

As it can further be seen from FIG. 1B, the antenna array 10 or the antenna, respectively, exemplarily comprises a reflective structure especially comprising the four reflectors 12*a*, 12*b*, 12*c*, 12*d* and the corresponding four double-tangential blended elliptical surfaces 13*a*, 13*b*, 13*c*, 13*d*. In this context, the basic shape of said reflective structure can substantially be a cross, preferably a cross without sharp edges. Preferably, the outer edges of said cross are smoothened with the aid of corresponding double-tangential blended elliptical surfaces.

Figure 2A:
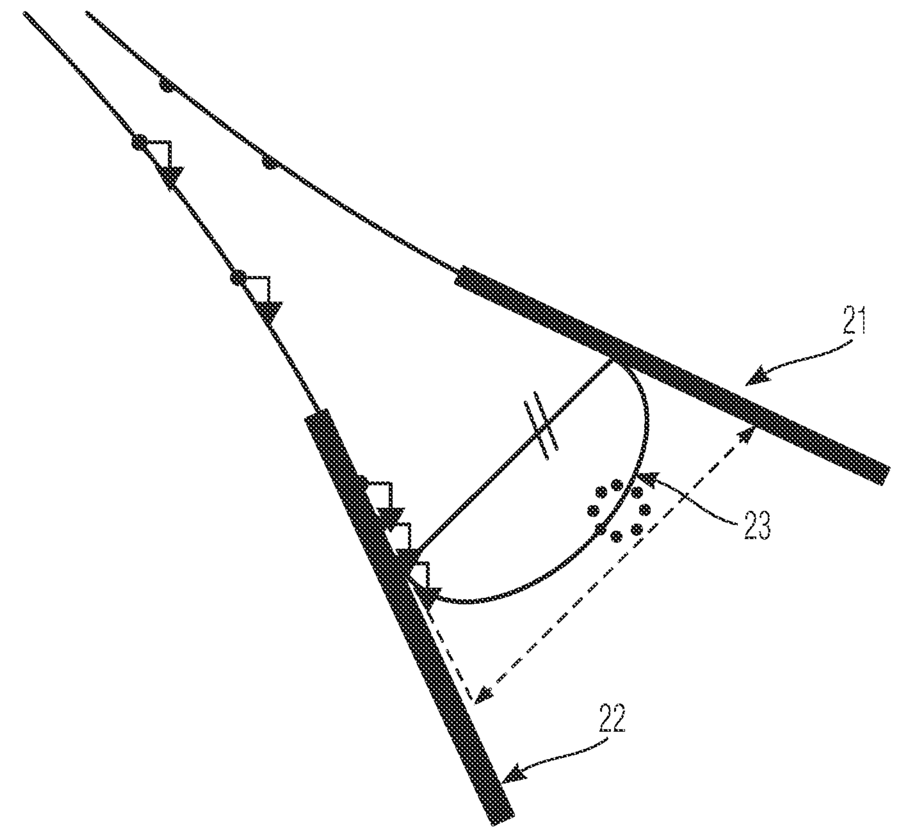
FIG. 2A shows an exemplary embodiment of a tangential blended elliptical edge in the sense of the invention.

Now, with respect to FIG. 2A, an exemplary embodiment of a tangential blended elliptical edge in the sense of the invention is depicted. Said embodiment may especially be seen as a magnification of one of the double-tangential blended elliptical surfaces 13*a*, 13*b*, 13*c*, 13*d* according to FIG. 1A or FIG. 1B, respectively. Accordingly, a double-tangential blended elliptical surface in the sense of the invention may especially comprise a tangential blended elliptical edge such as the one according to FIG. 2A.

With respect to said tangential blended elliptical edge, it is noted that it might be particularly advantageous if the tangential blended elliptical edge comprises or is a tangential symmetric blended elliptical edge.

In accordance with FIG. 2A, the corresponding embodiment exemplarily comprises a first tangential blend 21, a second tangential blend 22, and a symmetric elliptical edge. Accordingly, it might be particularly advantageous if a tangential blended symmetric elliptical curve connects adjacent disposed reflectors, especially adjacent circularly disposed reflectors such as the reflectors 12*a*, 12*b*, 12*c*, 12*d* of FIG. 1A or FIG. 1B, respectively.

Figure 2B:
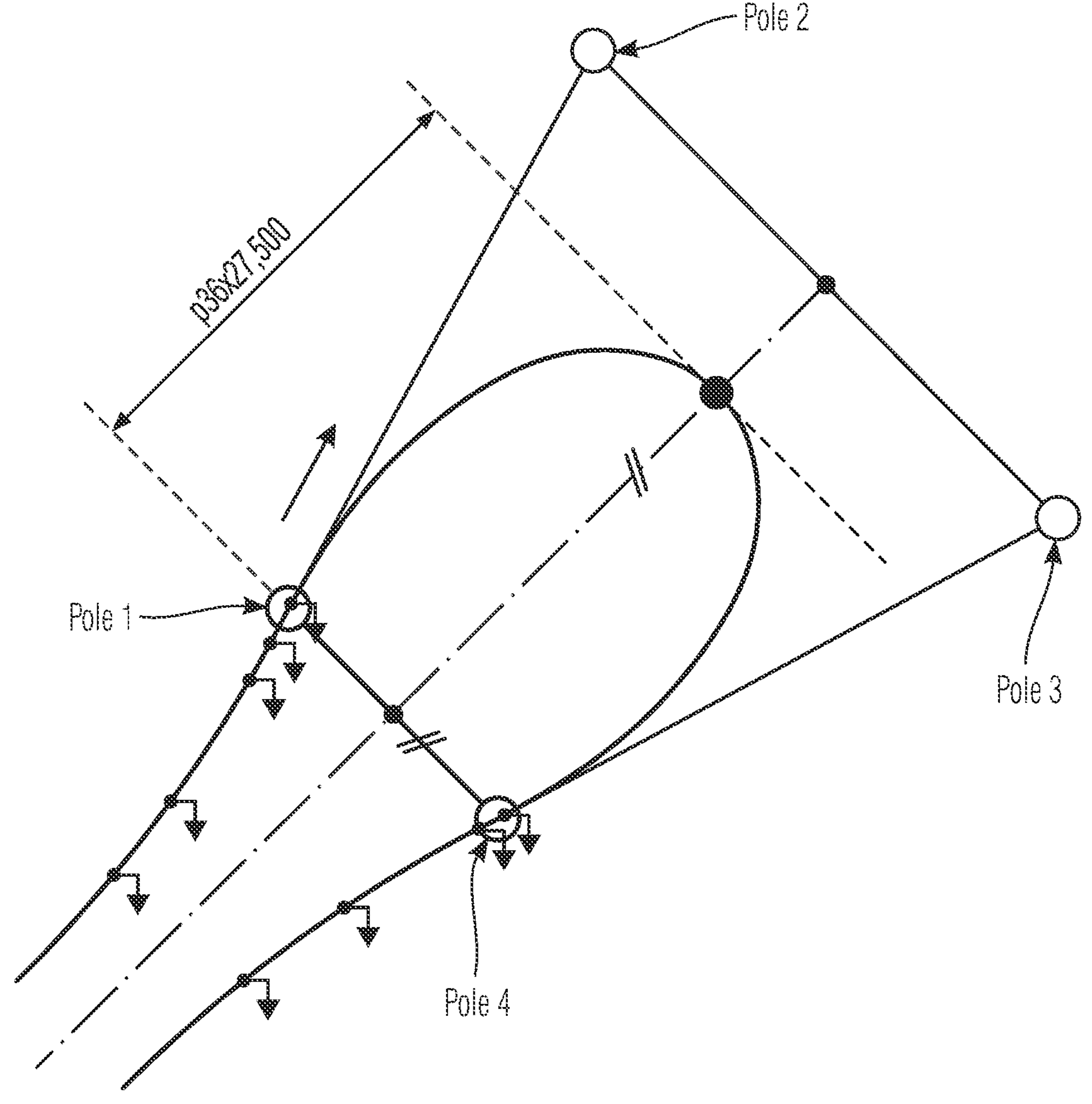
FIG. 2B shows further details of a tangential blended elliptical edge such as the one of FIG. 2A.

In the light of FIG. 2B, it is noted that it might be particularly advantageous if a tangential blended elliptical edge or a tangential symmetric blended elliptical edge, respectively, such as the one of FIG. 2A, is formed on the basis of four poles. In this context, said poles may substantially form the corners of an imaginary trapezoid, preferably an imaginary symmetrical trapezoid.

Figure 3:
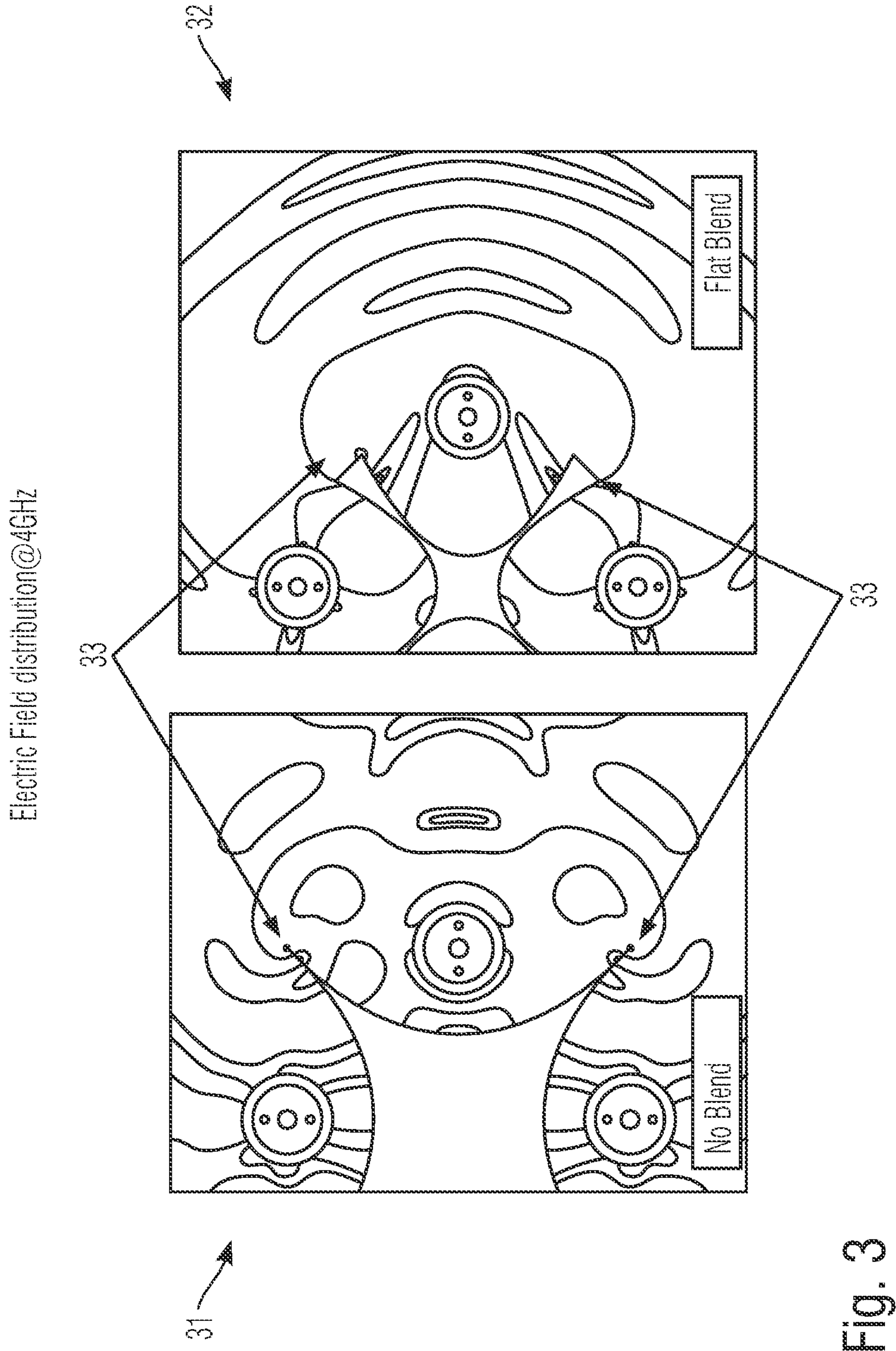
FIG. 3 shows two exemplary electric field distributions with respect to two non-inventive antenna arrays in the sense of no blend and a flat blend.

Furthermore, FIG. 3 shows a first exemplary electric field distribution 31 with respect to a first non-inventive antenna array in the sense of no blend regarding the corresponding reflectors.

In addition to this, a second exemplary electric field distribution 32 with respect to a second non-inventive antenna array in the sense of a flat blend regarding the corresponding reflectors is depicted.

As it can be seen in accordance with reference sign 33 of FIG. 3, in both cases, the no blend or flat blend areas, respectively, disadvantageously lead to a respective Huygen's radiator which re-radiates energy.

For the sake of completeness, it is noted that both electric field distributions 31 and 32 apply for a frequency of 4 GHz.

Figure 4:
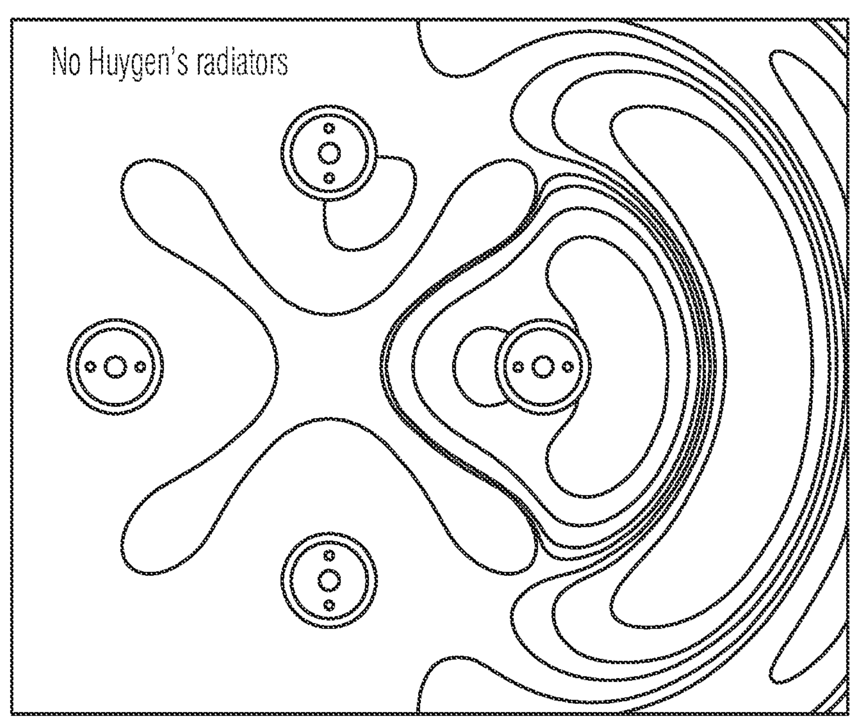
FIG. 4 shows an exemplary electric field distribution achieved by the invention.

Moreover, FIG. 4 shows an exemplary electric field distribution achieved by the invention, exemplarily by the antenna array 10 according to FIG. 1A or FIG. 1*b*, respectively. Advantageously, due to the inventive configuration, any Huygen's radiator is avoided. It is noted that the electric field distribution of FIG. 4 exemplarily applies for a frequency of 4 GHz.

Figure 5:
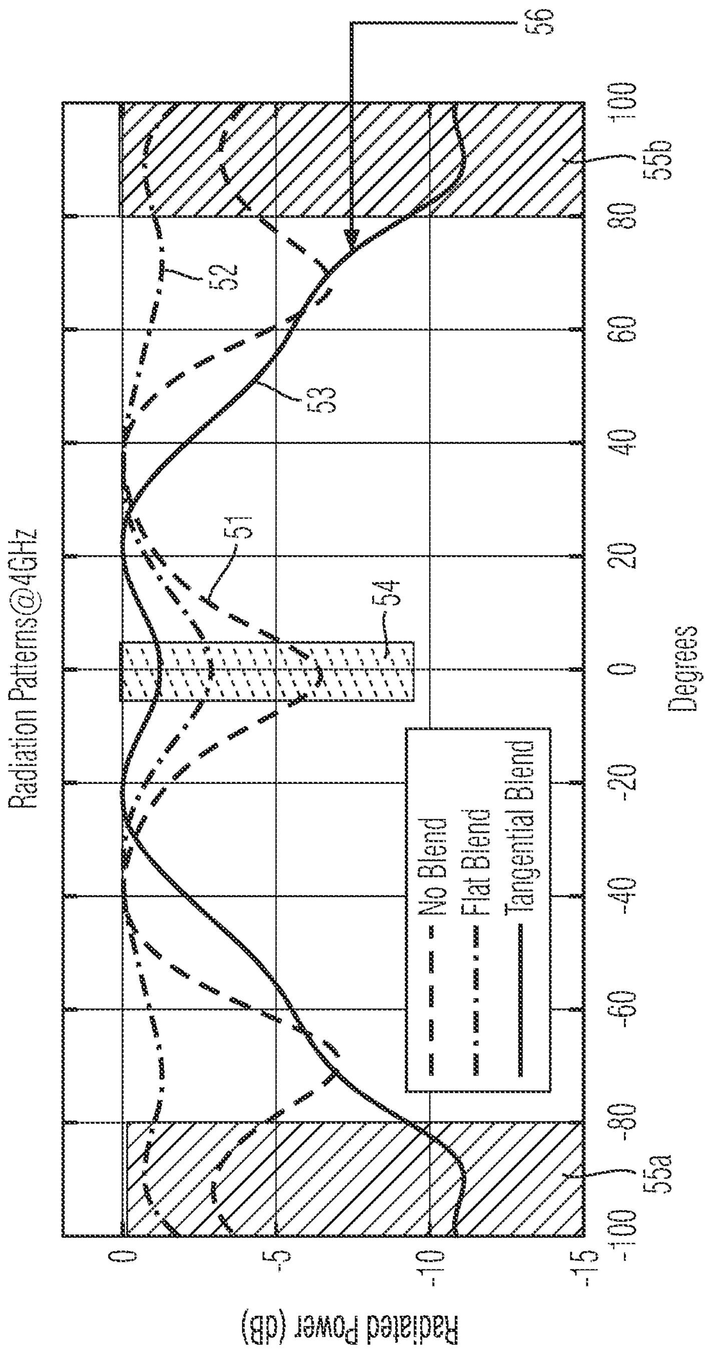
FIG. 5 shows an exemplary comparison of non-inventive radiation patterns with an inventive one.

Finally, FIG. 5 illustrates an exemplary comparison of non-inventive radiation patterns, such as ones being based on the non-inventive antenna arrays mentioned in the context of FIG. 3 above, with an inventive one such as one being based on the antenna array 10 according to FIG. 1A or FIG. 1B, respectively.

FIG. 5 shows a first exemplary radiation pattern 51 with respect to a first non-inventive antenna array in the sense of no blend regarding the corresponding reflectors.

In addition to this, a second exemplary radiation pattern 52 with respect to a second non-inventive antenna array in the sense of a flat blend regarding the corresponding reflectors is depicted.

Further additionally, FIG. 5 shows a third exemplary radiation pattern 53 with respect to an inventive antenna array in the sense of a double-tangential blended elliptical surface regarding the corresponding reflectors.

It is noted that it might be particularly advantageous if the corresponding radiated power in area 54, exemplarily marking a range between −5 degrees and 5 degrees, especially the corresponding boresight, is at least 3 dB higher than in areas 55*a*, 55*b*, exemplarily marking ranges between −100 degrees and −80 degrees and between 80 degrees and 100 degrees, especially at −90 degrees or 90 degrees, respectively.

In accordance with reference sign 56 of FIG. 5, the invention, exemplarily the antenna array 10 according to FIG. 1A or FIG. 1B, respectively, allows for a corresponding radiated power being significantly higher, exemplarily more than 10 dB higher, at 0 degrees than at −90 degrees or 90 degrees, respectively.

In addition to this, as it can further be seen from FIG. 5, it is noted that the non-inventive radiation patterns 51 and 52 disadvantageously comprise a corresponding radiated power being higher at −90 degrees or 90 degrees, respectively, than at 0 degrees.

For the sake of completeness, it is further noted that each of the exemplary radiation patterns 51, 52, 53 exemplarily applies for a frequency of 4 GHz.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. An antenna comprising:

at least two radiating elements with at least two reflectors offset from the at least two radiating elements, wherein at least two adjacent reflectors of the at least two reflectors are connected with a double-tangential blended elliptical surface.

2. The antenna according to claim 1, wherein the double-tangential blended elliptical surface comprises a double-tangential blended elliptical reflector, and/or wherein the antenna is used for direction finding.

3. The antenna according to claim 1, wherein the double-tangential blended elliptical surface is configured to create a smooth surface.

4. The antenna according to claim 3, wherein the smooth surface is configured such that there is no boundary between the at least two adjacent reflectors in order to avoid creating a Huygen's source.

5. The antenna according to claim 1, wherein the at least two radiating elements are four wideband radiating elements, or wherein the at least two reflectors are four reflectors, or wherein the antenna comprises four double-tangential blended elliptical surfaces.

6. The antenna according to claim 1, wherein the at least two reflectors are arranged in a circular manner.

7. The antenna according to claim 1, wherein at least one of the at least two reflectors comprises or is of a parabolic shape.

8. The antenna according to claim 1, wherein at least one of the at least two reflectors comprises or is of a circular shape.

9. The antenna according to claim 1, wherein at least one of the at least two reflectors comprises or is of a flat shape.

10. The antenna according to claim 1, wherein at least one of the at least two reflectors comprises or is of a ellipsoidal shape.

11. The antenna according to claim 1, wherein at least one of the at least two reflectors comprises or is of a hyperbolic shape.

12. An antenna array comprising:

at least two antennas with at least two reflectors, wherein at least two adjacent reflectors of the at least two reflectors are connected with a double-tangential blended elliptical surface.

13. The antenna array according to claim 12, wherein at least one of the at least two antennas comprises an antenna comprising at least two radiating elements with at least two reflectors offset from the at least two radiating elements, wherein at least two adjacent reflectors of the at least two reflectors are connected with a double-tangential blended elliptical surface, and/or wherein the antenna array is used for direction finding.

14. The antenna array according to claim 12, wherein each of the at least two antennas comprises or is an antenna at least two radiating elements with at least two reflectors offset from the at least two radiating elements, and wherein at least two adjacent reflectors of the at least two reflectors are connected with a double-tangential blended elliptical surface.

15. The antenna array according to claim 12, wherein the at least two antennas are four circularly arranged antennas.

* * * * *